(12) United States Patent
Jones-Muth

(10) Patent No.: US 12,265,836 B1
(45) Date of Patent: Apr. 1, 2025

(54) LOCALIZATION MIDDLEWARE

(71) Applicant: Crowdstrike, Inc., Sunnyvale, CA (US)

(72) Inventor: Vince Jones-Muth, Minneapolis, MN (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/592,104

(22) Filed: Feb. 29, 2024

(51) Int. Cl.
*G06F 9/451* (2018.01)

(52) U.S. Cl.
CPC .................................... *G06F 9/454* (2018.02)

(58) Field of Classification Search
None
See application file for complete search history.

(56) References Cited

U.S. PATENT DOCUMENTS

| | | | |
|---|---|---|---|
| 6,415,249 | B1 | 7/2002 | Blakely et al. |
| 6,976,090 | B2 | 12/2005 | Ben-Shaul et al. |
| 10,223,356 | B1* | 3/2019 | Seillier ................ G06F 40/47 |
| 11,449,688 | B2 | 9/2022 | Scharnbacher et al. |
| 2003/0115552 | A1* | 6/2003 | Jahnke .................. G06F 40/40 |
| | | | 715/201 |
| 2005/0071150 | A1* | 3/2005 | Nasypny ............ G06F 16/3344 |
| | | | 707/E17.084 |
| 2008/0172603 | A1* | 7/2008 | Agarwal .............. G06F 40/143 |
| | | | 715/239 |
| 2010/0088695 | A1* | 4/2010 | Kakinari ................ G06F 9/454 |
| | | | 709/217 |
| 2012/0016656 | A1* | 1/2012 | Travieso ............. G06F 16/9537 |
| | | | 704/2 |
| 2013/0144596 | A1* | 6/2013 | Lui ....................... G06F 40/47 |
| | | | 704/E11.001 |
| 2013/0238988 | A1* | 9/2013 | Lee ....................... G06F 40/58 |
| | | | 715/264 |

(Continued)

FOREIGN PATENT DOCUMENTS

| | | |
|---|---|---|
| CN | 101290570 A | 10/2008 |
| CN | 113244624 A | 8/2021 |

(Continued)

OTHER PUBLICATIONS

Malinowski et al., "The Future of Language Technology: The Benefits and Dangers of Translation Proxy", Lionbridge, Jan. 22, 2021, Lionbridge Technologies, LLC. URL: https://www.lionbridge.com/blog/translation-localization/the-future-of-language-technology-the-benefits-and-dangers-of-translation-proxy/.

*Primary Examiner* — Umut Onat
(74) *Attorney, Agent, or Firm* — Womble Bond Dickinson (US) LLP

(57) ABSTRACT

A system and method of a localization middleware for localizing datasets using textual replacement techniques. The method includes receiving a request for a particular dataset that is stored in a data store, the particular dataset includes a plurality of textual strings in a non-regional version. The method includes determining a regional version for the particular dataset based on the request. The method includes identifying a library of translations associated with the non-regional version and the regional version. The method includes performing, by a processing device based on the library of translations and the particular dataset, a string replacement procedure to generate a localized dataset including one or more textual strings in the regional version.

20 Claims, 6 Drawing Sheets

(56) References Cited

U.S. PATENT DOCUMENTS

2013/0326347 A1\* 12/2013 Albright ................. G06F 9/454
　　　　　　　　　　　　　　　　　　　　　　715/265
2016/0350108 A1\* 12/2016 Joo ....................... G06F 40/242
2017/0289166 A1\* 10/2017 Self ....................... H04L 63/102

FOREIGN PATENT DOCUMENTS

| GB | 2524491 A | 9/2015 |
|---|---|---|
| JP | 2013033320 A | 2/2023 |

\* cited by examiner

LOCALIZATION MIDDLEWARE

TECHNICAL FIELD

The present disclosure relates generally to data localization, and more particularly, to systems and methods of a localization middleware for localizing datasets using textual/string replacement techniques.

BACKGROUND

Data localization is the practice of keeping and/or translating data into the local language that is associated with the geographic location from which the data originated from. Some legal standards have data residency requirements that compel organizations to localize their data. In some instances, data localization is the action of complying with data residency requirements.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
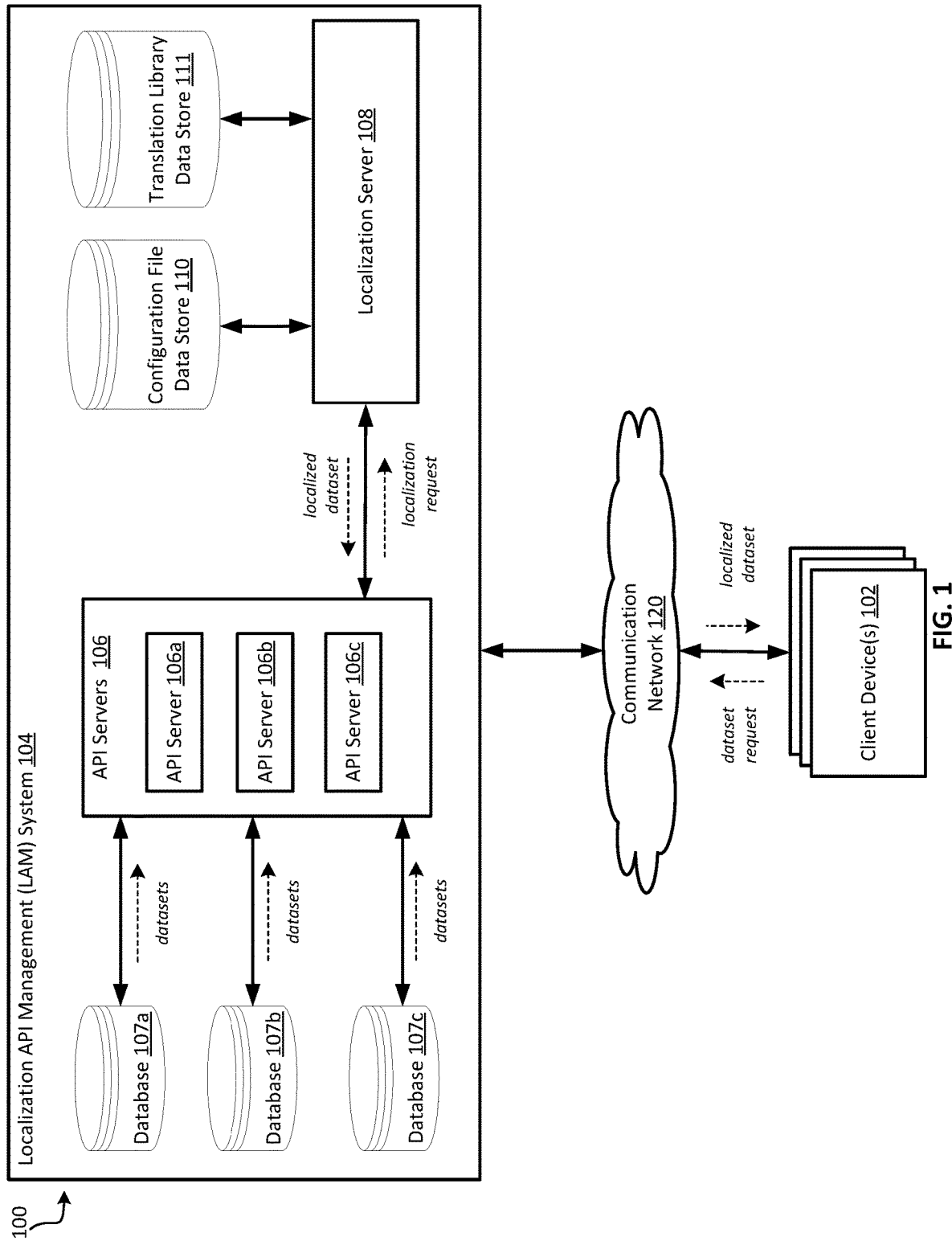
FIG. 1 is a block diagram depicting an example environment for localizing datasets using textual replacement techniques, according to some embodiments.

For simplicity of description, many embodiments discussed herein describe a localization middleware for localizing datasets using textual/string replacement techniques. However, it is understood that any of these embodiments may be configured to perform localizing on not only language, but also on different resource hyperlinks for different regions, different displayed data to meet regional requirements, and/or the like.

There are a countless number of languages (e.g., French, English, etc.) spoken throughout the world. Although a specific person might be able to speak several languages, they often prefer to communicate using a single language. This "preferred language", for example, could be the language they speak in the home and/or it could be the language that is most-common to their geographic region. The concept of language also applies to computer languages. For example, a C++ developer would prefer to read C++ source code instead of struggling to understand another computer language, such as Python®. Whether the content is human language or computer language, a localization system may be used to translate the content from a first language (or language format) to a second language (or language format).

However, conventional localization systems require for a developer to find every place a textual string (e.g., one or more characters, a word, a phrase, a sentence, a hyperlink, computer source code, etc.) is used in a dataset stored in a file or memory and extract the string to a separate file with a key. After extracting the string, the conventional localization system uses a translate helper function to output the translated string. The drawback, however, is that this conventual translation technique requires an abundance of time, computing resources (e.g., processing, memory, data storage, and/or networking bandwidth) and power consumption to perform the translations. Additionally, not all strings are stored in static files, many times they are stored in databases which generally requires each database to store additional localized content.

Aspects of the present disclosure address the above-noted and other deficiencies by a providing a localization middleware for localizing datasets using textual/string replacement techniques. The middleware service can intercept responses directed to an application programming interface (API) server and replace specific property values with localized strings. The middleware service uses a configuration file that indicates which paths (e.g., strings) to localize and then perform a string replacement before returning the response to the requestor. The middleware service uses a default string (e.g., in English) as the key for storing translations to improve look-up time. Additionally, the middleware service can extract dynamic values from strings to be hydrated back into localized strings.

In an illustrative embodiment, a location application programming interface management (LAM) system includes a plurality of API servers and a localization server. The localization server receives, from an API server of the plurality of API servers, a request for a particular dataset that is stored in a data store. The particular dataset includes a plurality of textual strings (e.g., one or more characters, a word, a phrase, a sentence, a hyperlink, computer source code, etc.) in a non-regional version (e.g., human language such as English, computer programming language such as C++), where each string includes one or more characters, words, and/or punctuation. The localization server determines a regional version for the particular dataset based on the request. The localization server identifies a library of translations associated with the non-regional version and the regional version. The localization server performs, based on the library of translations and the particular dataset, a string replacement procedure to generate a localized dataset that includes one or more textual strings in the regional version.

FIG. 1 is a block diagram depicting an example environment for localizing datasets using string replacement techniques, according to some embodiments. Environment 100 includes a localization API management (LAM) system 104 and client devices 102 that are each communicably coupled together via a communication network 120. The LAM system 104 includes a plurality of API servers 106 (e.g., API server 106a, API server 106b, API server 106c). The LAM system 104 includes a localization server 108 (sometimes referred to as a middleware service) that is configured to localize datasets using string replacement techniques.

The LAM system 104 includes a plurality of databases 107 (e.g., database 107a, database 107b, database 107c) that are configured to store different datasets. In some embodiments, each database corresponds to a flat file or a memory location.

The LAM system 104 includes a configuration file data store that includes a plurality of configuration files that are associated with the plurality of API servers 106, where each configuration file is respectively associated with a respective API servers 106. For example, a first configuration file is associated with API servers 106a, a second configuration file is associated with API servers 106b, and a third configuration file is associated with API servers 106c. A configuration file includes information that indicates the particular portions of a compiled response (or dataset) that should or should not be localized via a string replacement operation. Each configuration file data store may be a database, a flat file, or a memory location.

The LAM system 104 includes a translation library data store that includes a plurality of translation libraries. Each translation library includes a plurality of textual strings in a first language that are mapped (e.g., linked, associate) to a second language. For example, a particular translation library may include a first string in English mapped to a first string in French and a second string in German mapped to a second string in Italian. Each translation library data store may be a database, a flat file, or a memory location.

In some embodiments, each of the components (e.g., databases 107, API servers 106, localization server 108) of the LAM system 104 may be housed into a single computing device (e.g., a server, a laptop, a desktop, etc.). However, in other embodiments, some or all of the components of the LAM system 104 may be included into separate computing device and/or database. For example, each of the API servers 106 and the localization server 108 may correspond to its own separate server that is geographically/physically separate from the servers. Similarly, each of the databases 107 may correspond to its own separate database that is geographically/physically separate from the servers and other databases.

The communication network 120 may be a public network (e.g., the internet), a private network (e.g., a local area network (LAN) or wide area network (WAN), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

A LAM system 104, API server 106, and client device 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

A computing device may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). A computing device may use the same type or different types of virtual environments. For example, all of the computing devices may be VMs. In another example, all of the computing devices may be containers. In a further example, some of the computing devices may be VMs, other computing device may be containers, and other computing devices may be computing devices (or groups of computing devices).

Still referring to FIG. 1, the localization server 108 receives, from API server 106a of the plurality of API servers 106, a request for a particular dataset that is stored in a data store 107. The particular dataset includes a plurality of textual strings in a particular language (sometimes referred to as non-regional version), where each string includes one or more characters, words, and/or punctuation. The localization server 108 determines an alternate or different language (sometimes referred to as regional version) for the particular dataset based on the request. For example, the localization server 108 may determine a user associated with the request prefers a particular language (e.g., French). The localization server 108 identifies a library of translations associated with the particular language and the different language. The localization server 108 performs, based on the library of translations and the particular dataset, a string replacement procedure to generate a localized dataset that includes one or more textual strings in the different language.

Although FIG. 1 shows only a select number of computing devices (e.g., LAM system 104, API servers 106, client devices 102); the environment 100 may include any number of computing devices that are interconnected in any arrangement to facilitate the exchange of data between the computing devices.

Figure 2B:
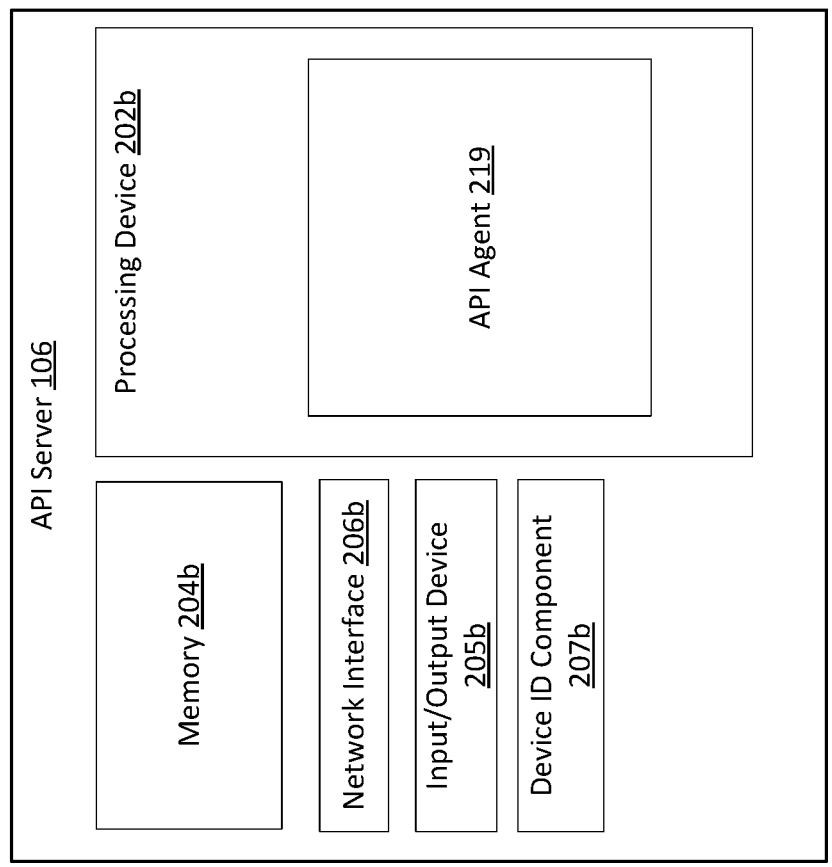
FIG. 2B is a block diagram depicting an example of the application programming interface (API) server of the LAM system of the environment in FIG. 1, according to some embodiments.
Figure 2A:
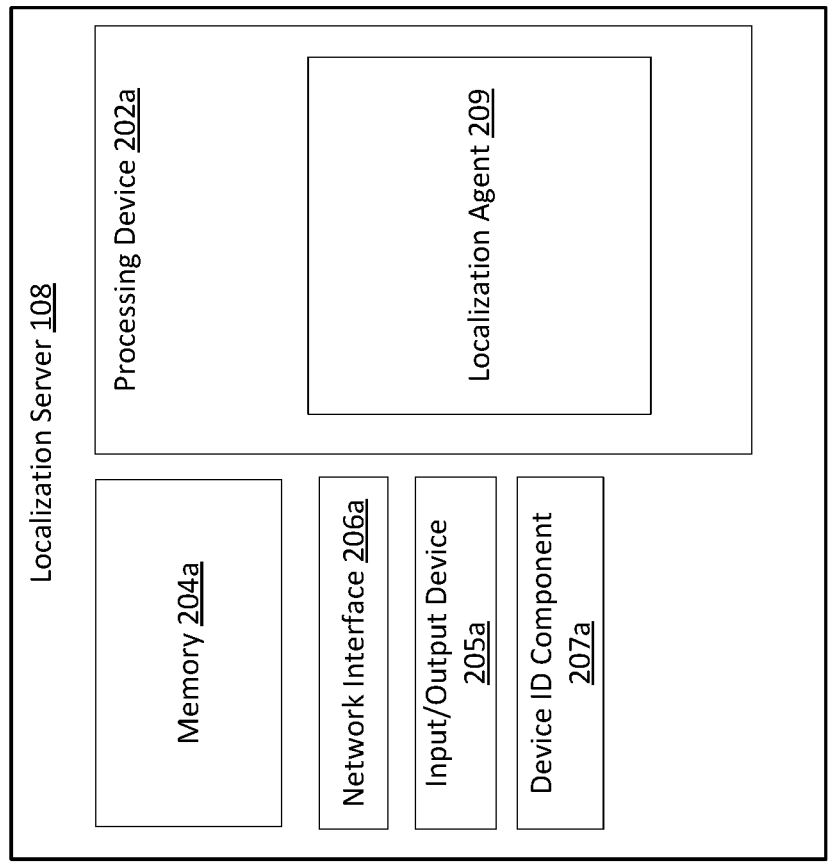
FIG. 2A is a block diagram depicting an example of the localization server of the localization application programming interface management (LAM) system of the environment in FIG. 1, according to some embodiments.

FIG. 2A is a block diagram depicting an example of the localization server of the localization application programming interface management (LAM) system of the environment in FIG. 1, according to some embodiments. While various devices, interfaces, and logic with particular functionality are shown, it should be understood that the localization server 108 includes any number of devices and/or components, interfaces, and logic for facilitating the functions described herein. For example, the activities of multiple devices may be combined as a single device and implemented on the same processing device (e.g., processing device 402a), as additional devices and/or components with additional functionality are included.

The localization server 108 includes a processing device 202a (e.g., general purpose processor, a PLD, etc.), which may be composed of one or more processors, and a memory

204a (e.g., synchronous dynamic random-access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the localization server 108. In some embodiments, the processing device 202a and the memory 204a form various processing devices and/or circuits described with respect to the localization server 108. The instructions include code from any suitable computer programming language such as, but not limited to, C, C++, C#, Java®, JavaScript®, VBScript, Perl®, HTML, XML, Python®, TCL/TK®, and Basic.

The processing device 202 executes a localization agent 209 that may be configured to receive a request for a particular dataset that is stored in a data store. The particular dataset includes a plurality of textual strings in a particular language. The localization agent 209 may be configured to determine a different language for the particular dataset based on the request. The localization agent 209 may be configured to identify a library of translations associated with the particular language and the different language. The localization agent 209 may be configured to perform, based on the library of translations and the particular dataset, a string replacement procedure to generate a localized dataset comprising one or more textual strings in the different language.

In some embodiments, the request comprises a language identifier to the different language in a language header of the request.

The localization agent 209 may be configured to provide a client device associated with the request with access to the localized dataset.

The localization agent 209 may be configured to maintain, in a second data store, a plurality of associations between a plurality of configuration files and a plurality of remote server identifiers to a plurality of remote servers. Each configuration file is respectively associated with a respective remote server identifier.

The localization agent 209 may be configured to determine that the request is received from a first remote server of a plurality of remote servers. The localization agent 209 may be configured to select, from among a plurality of configuration files that are respectively associated with the plurality of remote servers, a first configuration file that is associated with the first remote server. The localization agent 209 may be configured to perform the string replacement procedure is further based on the first configuration file.

In some embodiments, the first configuration file indicates a first set of strings for localization. In this embodiment, the localization agent 209 may further be configured to identify a second set of strings in the particular dataset based on the first set of strings.

The localization agent 209 may be configured to identify, from the library of translations, one or more translated strings based on the first set of strings. The localization agent 209 may be configured to replace the second set of strings in the particular dataset with the one or more translated strings. In some embodiments, the first configuration file indicates that a first portion of the first set of strings comprises a dynamic value.

The localization agent 209 may be configured to replace the second set of strings in the particular dataset with the one or more translated strings by overwriting a second portion of the one or more translated strings with the dynamic value.

The localization agent 209 that may be configured to determine an error associated with performing the string replacement procedure based on the library of translations. The localization agent 209 that may be configured to identify a default library of translations associated with a default language. The localization agent 209 that may be configured to perform, based on the library of translations and the particular dataset, a different string replacement procedure to generate a second localized dataset comprising one or more textual strings in the default language.

The localization server 108 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee®, Bluetooth®, Wi-Fi, or the like), a wired network interface, a combination thereof (e.g., both a cellular transceiver and a Bluetooth transceiver), and/or the like. In some embodiments, the localization server 108 includes a plurality of network interfaces 206a of different types, allowing for connections to a variety of networks, such as local area networks (public or private) or wide area networks including the Internet, via different sub-networks.

The localization server 108 includes an input/output device 205a configured to receive user input from and provide information to a user. In this regard, the input/output device 205a is structured to exchange data, communications, instructions, etc. with an input/output component of the localization server 108. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the localization server 108, such as a built-in display, touch screen, microphone, etc., or external to the housing of the localization server 108, such as a monitor connected to the localization server 108, a speaker connected to the localization server 108, etc., according to various embodiments. In some embodiments, the localization server 108 includes communication circuitry for facilitating the exchange of data, values, messages, and the like between the input/output device 205a and the components of the localization server 108. In some embodiments, the input/output device 205a includes machine-readable media for facilitating the exchange of information between the input/output device 205a and the components of the localization server 108. In still another embodiment, the input/output device 205a includes any combination of hardware components (e.g., a touchscreen), communication circuitry, and machine-readable media.

The localization server 108 includes a device identification component 207a (shown in FIG. 2A as device ID component 207a) configured to generate and/or manage a device identifier associated with the localization server 108. The device identifier may include any type and form of identification used to distinguish the localization server 108 from other computing devices. In some embodiments, to preserve privacy, the device identifier may be cryptographically generated, encrypted, or otherwise obfuscated by any device and/or component of the localization server 108. In some embodiments, the localization server 108 may include the device identifier in any communication (e.g., classifier performance data, input message, parameter message, etc.) that the localization server 108 sends to a computing device.

The localization server 108 includes a bus (not shown), such as an address/data bus or other communication mechanism for communicating information, which interconnects the devices and/or components of the localization server 108, such as processing device 202a, network interface 206a, input/output device 205a, and device ID component 207a.

In some embodiments, some or all of the devices and/or components of localization server 108 may be implemented with the processing device 202a. For example, the localization server 108 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the application programming interface (API) server of the LAM system of the environment in FIG. 1, according to some embodiments. While various devices, interfaces, and logic with particular functionality are shown, it should be understood that the API server 106 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The API server 106 includes a processing device 202b (e.g., general purpose processor, a PLD, etc.), which may be composed of one or more processors, and a memory 204b (e.g., synchronous dynamic random-access memory (DRAM), read-only memory (ROM)), which may communicate with each other via a bus (not shown). The processing device 202b includes identical or nearly identical functionality as processing device 202a in FIG. 2a, but with respect to devices and/or components of the API server 106 instead of devices and/or components of the localization server 108.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the API server 106 instead of devices and/or components of the localization server 108.

The processing device 202a executes an API agent 219 that may be configured to be exposed to the client device 102. The API agent 219 may be configured to receive a dataset request from a client device 102 for a particular dataset. The API agent 219 may be configured to extract a location identifier from the dataset request. The API agent 219 may be configured to determine that the dataset indicated in the request is stored in one or more of the databases 107, and in response, fetch the dataset from the one or more of the databases 107.

The API agent 219 may be configured to generate a compiled response that includes the fetched dataset, the language identifier, and/or a scope indicator indicating the API agent 219. The API agent 219 may be configured to send a localization request to the localization server 108 for the localization server 108 to localize (e.g., perform string replacement techniques) the compiled response and/or the fetched dataset in the compiled response.

The API agent 219 may be configured to receive a localized dataset from the localization server 108 and forward the localized dataset to the client device 102 that initially sent the dataset request.

The API server 106 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the API server 106 instead of devices and/or components of the localization server 108.

The API server 106 includes an input/output device 205b configured to receive user input from and provide information to a user. In this regard, the input/output device 205b is structured to exchange data, communications, instructions, etc. with an input/output component of the API server 106. The input/output device 205b includes identical or nearly identical functionality as input/output device 205a in FIG. 2A, but with respect to devices and/or components of the API server 106 instead of devices and/or components of the localization server 108.

The API server 106 includes a device identification component 207b (shown in FIG. 2B as device ID component 207b) configured to generate and/or manage a device identifier associated with the API server 106. The device ID component 207b includes identical or nearly identical functionality as device ID component 207a in FIG. 2A, but with respect to devices and/or components of the API server 106 instead of devices and/or components of the localization server 108.

The API server 106 includes a bus (not shown), such as an address/data bus or other communication mechanism for communicating information, which interconnects the devices and/or components of the API server 106, such as processing device 202b, network interface 206b, input/output device 205b, and device ID component 207b.

In some embodiments, some or all of the devices and/or components of the API server 106 may be implemented with the processing device 202b. For example, the API server 106 may be implemented as a software application stored within the memory 204b and executed by the processing device 202b. Accordingly, such an embodiment can be implemented with minimal or no additional hardware costs. In some embodiments, any of these above-recited devices and/or components rely on dedicated hardware specifically configured for performing operations of the devices and/or components.

Figure 2C:
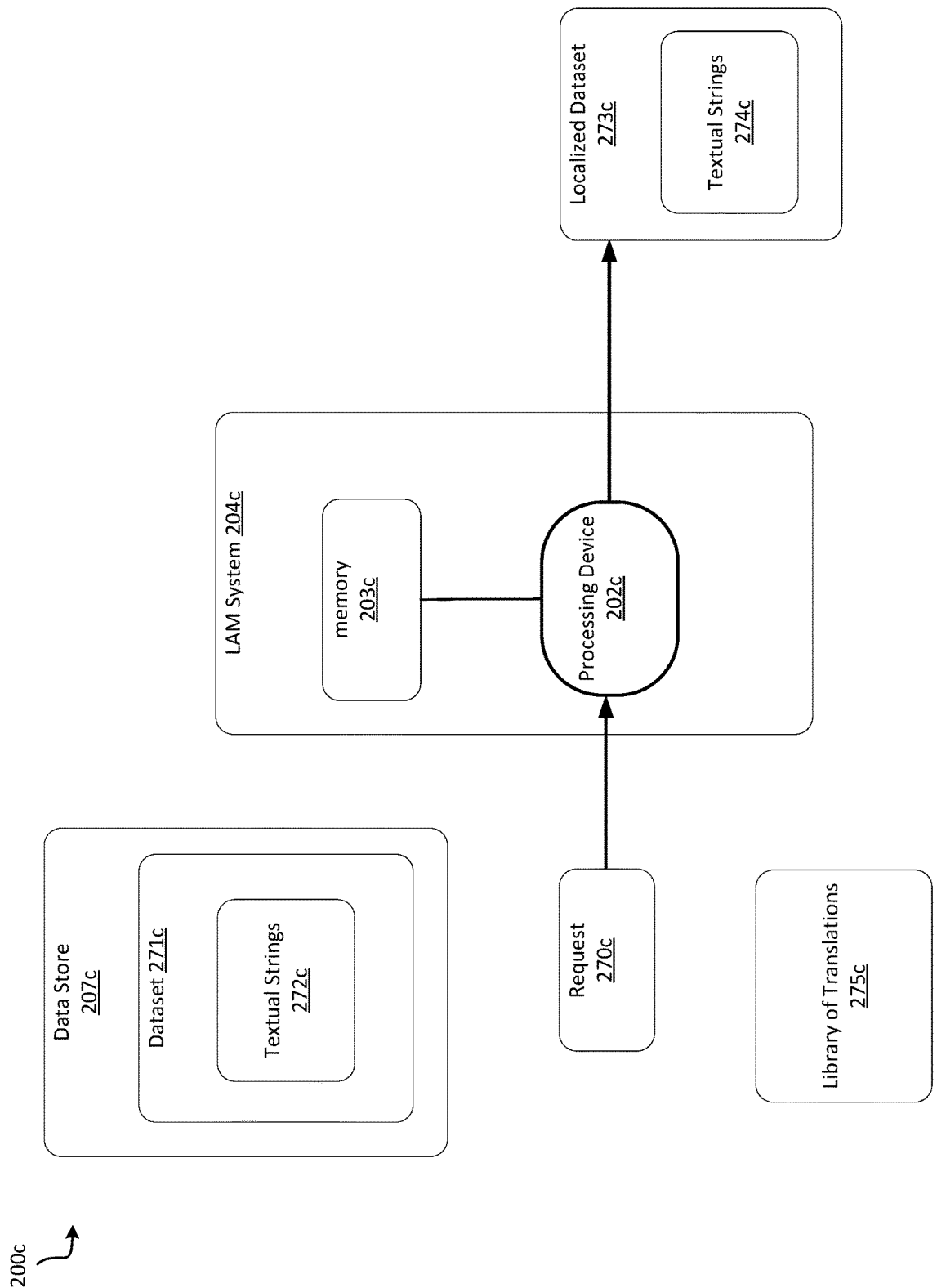
FIG. 2C is a block diagram depicting an example environment for using the LAM system 104 in FIG. 1 to localize datasets, according to some embodiments, according to some embodiments.

FIG. 2C is a block diagram depicting an example environment for using the LAM system 104 in FIG. 1 to localize datasets, according to some embodiments, according to some embodiments. The LAM system 204c includes a memory 203c and a processing device 202c that is operatively coupled to the memory 203c. The processing device 202c is configured to receive a request 270c for a particular dataset 271c that is stored in a data store 207cc. The particular dataset 271c includes a plurality of textual strings 272c in a particular language. The processing device 202c is configured to determine a different language for the particular dataset 271c based on the request 270c. The processing device 202c is configured to identify a library of translations 275c associated with the particular language and the different language. The processing device 202c is configured to perform, based on the library of translations 275c and the particular dataset 271c, a string replacement procedure to generate a localized dataset 273c that includes one or more textual strings 274c in the different language.

Figure 3:
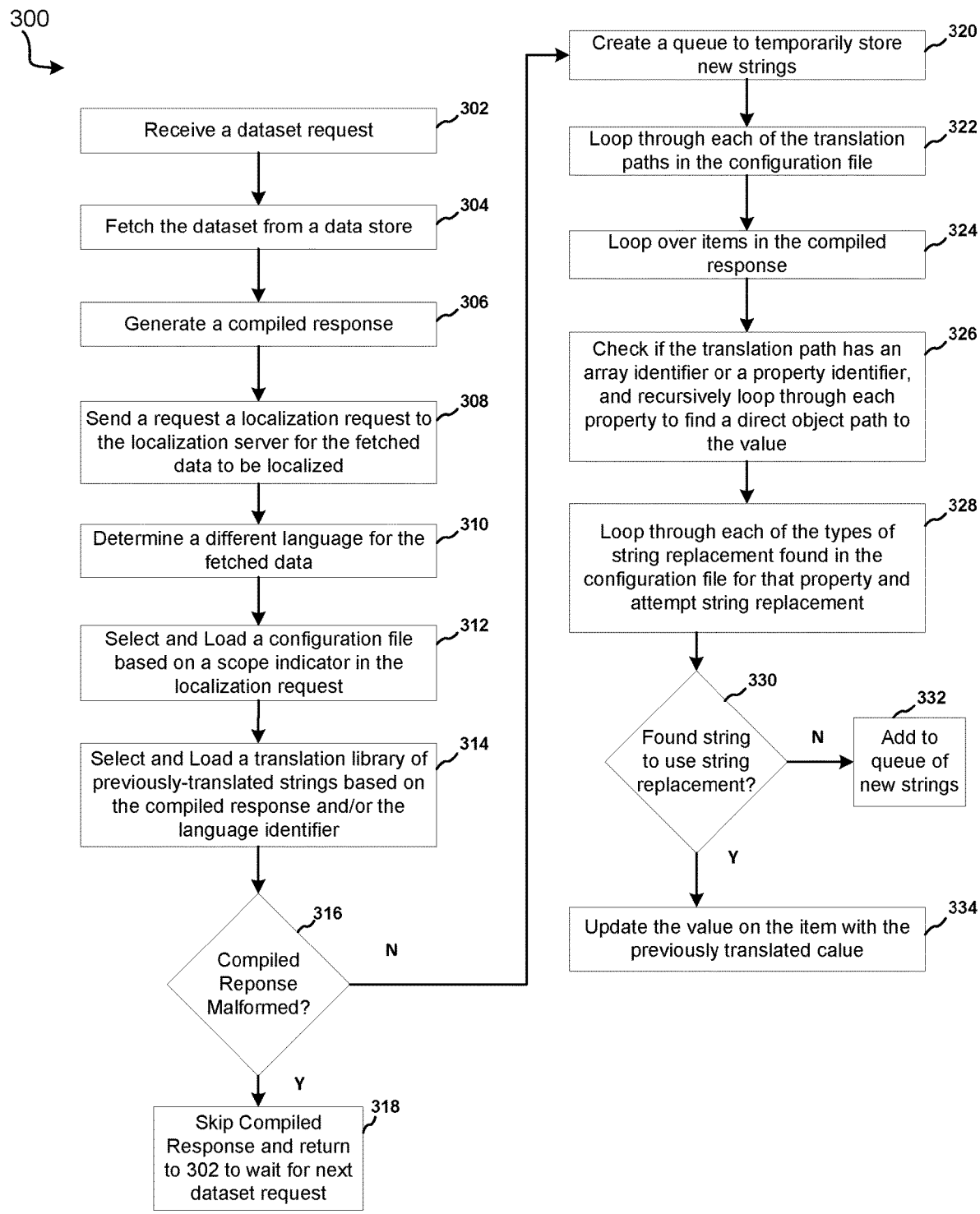
FIG. 3 is a flow diagram depicting a procedure for using the LAM system 104 in FIG. 1 to localize datasets, according to some embodiments.

FIG. 3 is a flow diagram depicting a procedure for using the localization Application Programming Interface (API) Management system 104 in FIG. 1 to localize datasets, according to some embodiments. Although specific function blocks ("blocks") are disclosed in procedure 300, such blocks are examples. That is, embodiments are well suited to performing various other blocks or variations of the blocks recited in procedure 300. It is appreciated that the blocks in procedure 300 may be performed in an order different than presented, and that not all of the blocks in procedure 300 may be performed.

The procedure 300 will be described with respect to FIG. 1. At block 302, an API server 106 (e.g., API server 106a) receives a request (shown in FIG. 1 as dataset request) from a client device 102 for a particular dataset. The dataset request may include a language identifier (sometimes referred to as a locale) in a language header of the request, where the language identifier may indicate a different language for the user of the client device 102. For example, the language identifier may indicate a different language (e.g., French) for the user based on the different language being a preferred language for the specific user and/or the different language being the most-common language spoken in the geographic location of the user. In some embodiments, the dataset request includes a geographic identifier (e.g., a city, a state, and/or a country) associated with the client device 102.

At block 304, the API server 106 fetches the dataset from a data store (e.g., a database, a flat file, a memory location, etc.). For example, the API server 106 may determine that the dataset is stored in the data store 102a, and in response, fetch the dataset from the data store 102a.

At block 306, the API server 106 generates a compiled response that includes the fetched dataset, the language identifier, and/or a scope indicator. The compiled response may include properties, such as 'id', 'title', 'description', and 'internal title'. An example compiled response may be as follows:

---

EXAMPLE COMPILED RESPONSE

```
{
    results: [
        {
            id: 1,
            title: 'Resource Foobar',
            description: 'This is the description for this item',
            internal_title: 'This is an internal title that we do not want localized'
        },
        {
            id: 2,
            title: 'This is a title',
            description: 'This is the description for another item',
            internal_title: 'This is an internal title that we do not want localized'
        }
    ]
}
```

---

The scope indicator indicates the path (sometimes referred to as API path) of the particular API server 106 that generated the compiled response. For example, the API server 106a may generate a scope indicator that indicates that the API server 106a generated the compiled response. The specific API path may indicate a Uniform Resource Locator (URL) associated with an API server 106, a network address (e.g., Media Address Control (MAC) address, Internet Protocol (IP) address)) associated with the API server 106, and/or a device name.

At block 308, the API server 106 sends a request (shown in FIG. 1 as a localization request) to the localization server 108 for the fetched data to be localized according to the language identifier, where the localization request includes the fetched data, the language identifier, and/or a scope indicator. In some embodiments, wherein the request does not include the fetched data, the localization server 108 may fetch the data from the one or more data stores indicated by the scope indicator.

At block 310, the localization server 108 determines and/or validates, for the fetched data, the different language for the user of the client device 102 based on the language identifier that is included in the localization request. For example, the localization server 108 may determine that the user of the client device prefers English because the language identifier indicates English. However, in some embodiments, the localization request includes a geographic identifier instead of the language identifier. In these embodiments, the API server 106 may determine the different language for the user of the client device 102 based on the geographic identifier. For example, the API server 106 may determine that the user's preferred language is French if the geographic identifier indicates that the client device 102 is located in France.

At block 312, the localization server 108 selects and loads a configuration file based on the scope indicator in the localization request. The localization server 108 identifies a configuration file based on the scope, retrieves the identified configuration file from the configuration files datastore 110, and loads the configuration file. The configuration file includes a 'translationPaths' parameter to indicates the one or more (or all) properties (e.g., 'id', 'title', 'description', and/or 'internal title') in the compiled response that should be localized.

An example configuration file may be as follows:

| EXAMPLE CONFIGURATION FILE |
| --- |
| {<br>  translationPaths: {<br>    results.<ARRAY>.title: [<br>      {<br>        "method": :dynamic",<br>        "translationKey": "Resource {{.Name}}"<br>      },<br>      {<br>        "method": "replace"<br>      }<br>    ]<br>    results.<ARRAY>.description: [{"method": "replace"}],<br>  },<br>} |

As shown above, the example configuration file includes a first translation path (e.g., results.<ARRAY>.title) and a second translation path (e.g., results.<ARRAY>.description). The first translation path indicates that the 'title' properties (e.g., 'Resource Foobar' and 'This is a title') in the example compiled response should be localized, but the textual elements (e.g., characters, strings, etc.) corresponding to the other properties (e.g., 'id' and 'internal title') should not be localized.

The example configuration also shows that first translation path (e.g., results.<ARRAY>.title) is associated with a method and a translation key (e.g., translationKey). The method indicates that the string (e.g., 'Resource Foobar') corresponding to the 'title' property includes dynamic values. The location of the dynamic values in the string are indicated by the translation key. For example, the translation key indicates that the "Resource" portion of the string corresponding to the 'title' property should be localized, but the "Foobar" portion of the string should not be localized.

In other words, each translation path in a configuration file specifies the particular method the localization server 108 should use to perform a string replacement operation. As mentioned herein, a string may contain a dynamic value, as indicated with a method of "dynamic", and which translation keys may be found in the dynamic value. This allows the localization server 108 to perform a string replacement operation while preserving the dynamic value. However, if the localization server 108 determines that its string replacement operation was not successful, then the localization server 108 can apply the fallback operation (e.g., "replace") that is indicated by the method property. Thus, the configuration file provides the localization server 108 with an order of operation to follow when performing a string replacement operation.

Each translation path in the configuration file indicates an array of replacement types that the localization server 108 can attempt to apply to perform the string replacement operation. If the configuration file indicates a 'replace' replacement type, then the localization server 108 performs the string replacement operation by looking-up the translation in a translation library that includes previously-translated strings. If the configuration file indicates a 'dynamic' replacement type, then the localization server 108 will loop through each of the potential matching translation keys and extract the dynamic values from the string in the compiled response. If the configuration file indicates a 'dynamicRegex' replacement type, then the localization server 108 will run the previously compiled regex to perform the matching and extraction of dynamic values.

An example translation library may be as follows:

| EXAMPLE TRANSLATION LIBRARY |
| --- |
| {<br>  "Resource {{.Name}}": "[Resource~{{.Name}}]",<br>  "This is the description for this item": "[This~is~the~description~for~this~item]",<br>  "This is a title": "[This~is~a~title]",<br>  "This is the description for another item": "[This~is~the~description~for~another~item]"<br>} |

At block 314, the localization server 108 selects and loads a translation library based on the compiled response and/or the language identifier. For example, the localization server 108 determines, based on the compiled response and/or the language identifier, that the fetched dataset in the compiled response is in a first language (e.g., English) and that the user's (of the client device 102) preferred language is in a second language (e.g., French), and in response, the localization server 108 selects (from the translation library 111) the particular translation library that maps strings in the first language to strings in the second language.

At block 316, the localization server 108 determines whether the compiled response is malformed (e.g., defective). If the localization server 108 determines that the compiled response is malformed, then the localization server 108 proceeds to block 318, where the localization server 108 skips localizing the compiled response and then returns to 302 to wait for next dataset request. For example, the localization server 108 may determine that the compiled response is malformed if the compiled response is missing one or more properties, the one or more properties are corrupted, portions of the fetched dataset are missing, and/or portions of the fetched dataset are corrupted. Alternatively, if the localization server 108 determines that the compiled response is not malformed, then the localization server 108 proceeds to block 320.

At block 320, the localization server 108 creates (e.g., initializes) a queue to temporarily store new strings that are found. At block 322, the localization server 108 loops through each of the translation paths in the configuration file. At block 324, given the translation path, localization server 108 loops over one or more item in the compiled response. At block 326, the localization server 108 checks if the translation path has an array identifier or a property identifier, and recursively loops through each property until the localization server 108 converges onto a direct object path to the value.

At block 328, the localization server 108 loop through each of the types of string replacement found in the configuration file for that property and tries to perform a string replacement based on that replacement type. The localization server 108 look-ups the translation value in a translation library associated with the compiled response and/or language identifier, and provides it with any dynamic values that were found in the string.

At block 330, if the localization server 108 was not successful in finding a string to do a replacement, then the localization server 108 proceeds to block 332 to add this to the queue (e.g., the queue that was setup at block 320) of new strings and leave it in its current language. However, if the localization server 108 was successful in finding a string to do a replacement, then the localization server 108 proceeds to block 334.

At block 334, the localization server 108 updates the value on the item with the translated value.

Furthermore, if localization server 108 did not find a translated value then the localization server 108 considers the string to be new and adds it to a queue to be processed later. In some embodiments, the localization server 108 can send these strings in the queue to a translation vendor to be translated.

Figure 4:
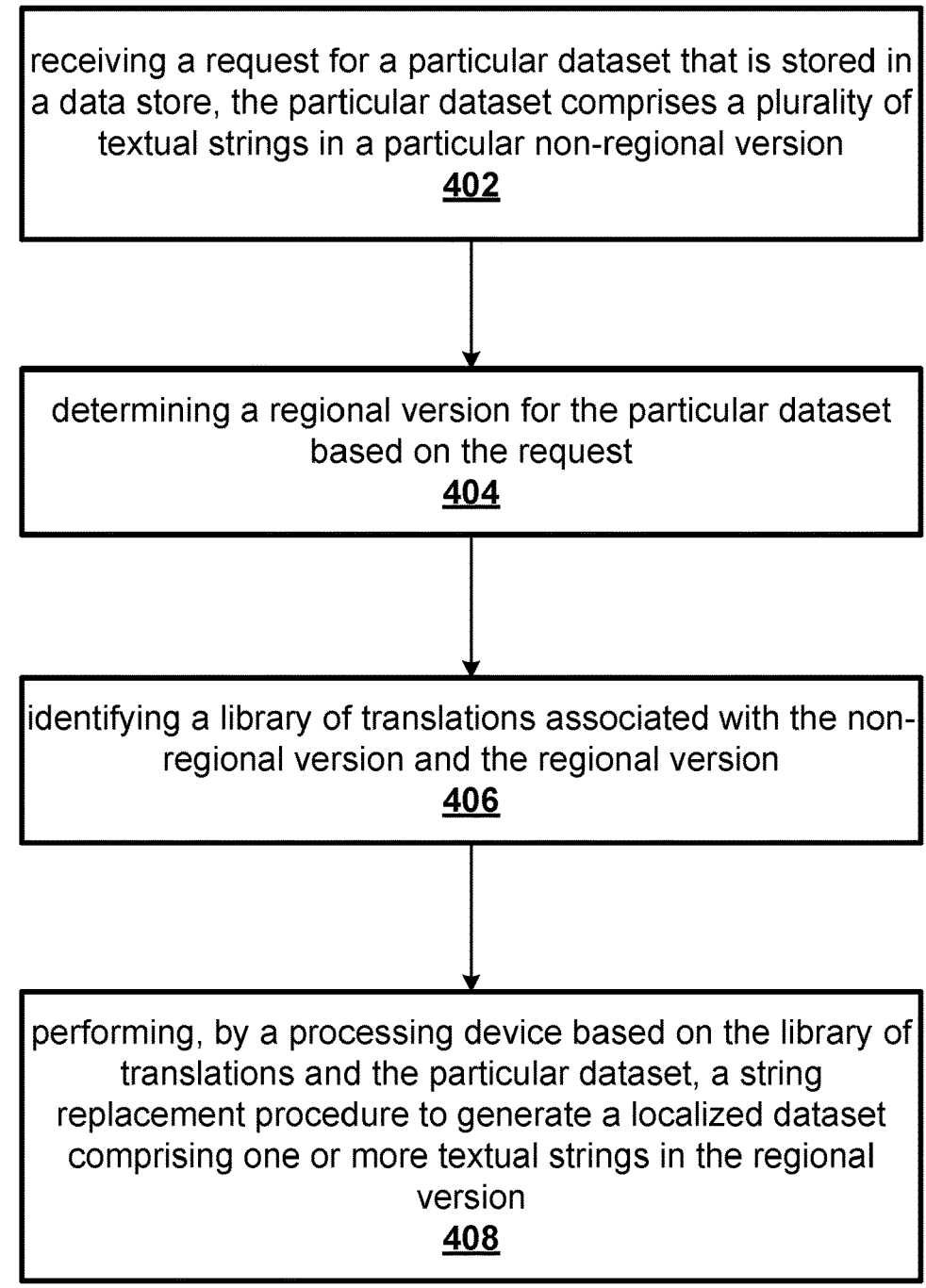
FIG. 4 is a flow diagram depicting a method of localizing datasets using textual replacement techniques, according to some embodiments.

FIG. 4 is a flow diagram depicting a method of localizing datasets using textual replacement techniques, according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by one or more components (e.g., API servers 106, localization server 108) of a localization API management (LAM) system, such as the LAM system 104 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of receiving a request for a particular dataset that is stored in a data store, the particular dataset comprises a plurality of textual strings in a particular language. The method 400 includes the block 404 of determining a different language (e.g., the user's preferred language) for the particular dataset based on the request. The method 400 includes the block 406 of identifying a library of translations associated with the particular language and the different language. The method 400 includes the block 408 of performing, by a processing device based on the library of translations and the particular dataset, a string replacement procedure to generate a localized dataset comprising one or more textual strings in the different language.

Figure 5:
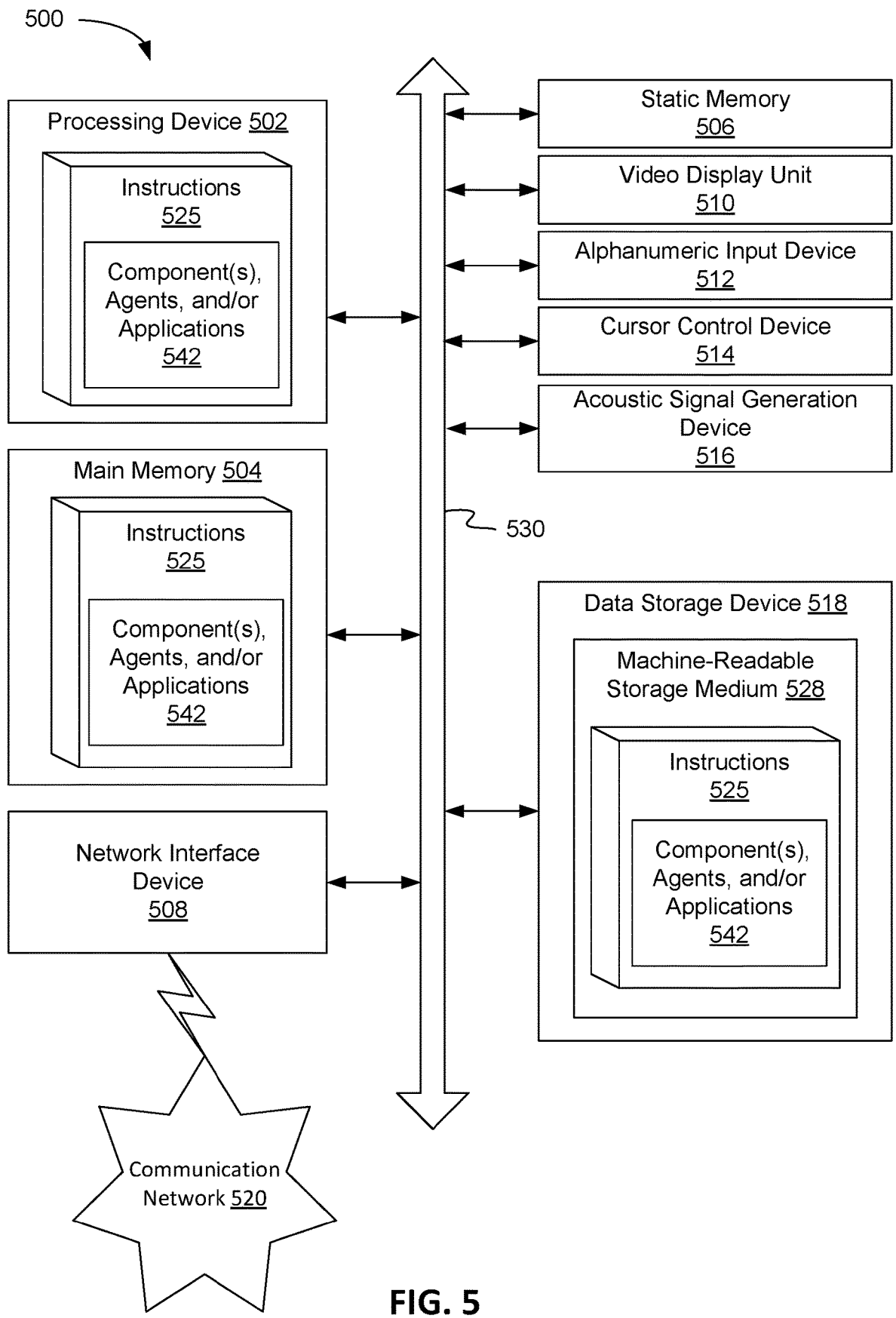
FIG. 5 is a block diagram of an example computing device that may perform one or more of the operations described herein, in accordance with some embodiments.

FIG. 5 is a block diagram of an example computing device that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components/programs/applications 542 (e.g., the localization agent 109 in FIG. 2A, etc.) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "identifying," "performing," "providing," "replacing," "overwriting," "selecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
receiving, from a first remote server of a plurality of remote servers, a request for a particular dataset that is stored in a data store, the particular dataset comprising a plurality of textual strings in a non-regional version;
determining a regional version for the particular dataset based on the request;
identifying a library of previously translated strings associated with the non-regional version and the regional version;
selecting, from among a plurality of configuration files that are respectively associated with the plurality of remote servers, a first configuration file that is associated with the first remote server, the first configuration file comprising first information indicating that first textual strings associated with a first set of properties should be localized and second information indicating that second textual strings associated with a second set of properties should not be localized;
identifying a first textual string of the particular dataset that is associated with the first set of properties and a second textual string of the particular dataset that is associated with the second set of properties;
generating, by a processing device in memory of the processing device and based on the library of previously translated strings and a string replacement procedure, a localized dataset comprising one or more textual strings in the regional version to reduce a power consumption and increase a networking bandwidth associated with communicating with the plurality of remote servers, wherein generating the localized dataset comprises replacing the first textual string of the particular dataset with a previously translated string stored in the library of previously translated strings and abstaining from replacing the second textual string with another translated string stored in the library of previously translated strings;
receiving a second request for a second dataset that is stored in the data store;
determining, in one or more libraries of previously translated strings, an absence of a localized string associated with the second dataset; and
providing, responsive to determining the absence of the localized string, the second dataset to a translator to translate the second dataset according to a translation procedure that is different from the string replacement procedure to generate a translated second dataset; and
updating, based on the translated second dataset, the library of previously translated strings to allow a generation of a third localized dataset on the localized string to occur according to the string replacement procedure instead of the translation procedure.

2. The method of claim 1, wherein the request comprises a language identifier to the regional version in a language header of the request, and wherein the regional version corresponds to a preferred language of a user associated with the request.

3. The method of claim 1, further comprising:
providing a client device associated with the request with access to the localized dataset.

4. The method of claim 1, further comprising:
maintaining, in a second data store, a plurality of associations between a plurality of configuration files and a plurality of remote server identifiers to a plurality of remote servers, wherein each configuration file is respectively associated with a respective remote server identifier.

5. The method of claim 1, further comprising:
determining that the request is received from the first remote server of a plurality of remote servers.

6. The method of claim 1, wherein the first configuration file indicates a first set of strings for localization, and further comprising:
identifying a second set of strings in the particular dataset based on the first set of strings.

7. The method of claim 6, further comprising:
identifying, from the library of previously translated strings, one or more translated strings based on the first set of strings; and
replacing the second set of strings in the particular dataset with the one or more previously translated strings.

8. The method of claim 7, wherein the first configuration file indicates that a first portion of the first set of strings comprises a dynamic value.

9. The method of claim 8, wherein replacing the second set of strings in the particular dataset with the one or more previously translated strings comprises:
overwriting a second portion of the one or more previously translated strings with the dynamic value.

10. The method of claim 1, further comprising:
determining an error associated with performing the string replacement procedure based on the library of previously translated strings;
identifying a default library of previously translated strings associated with a default language; and
performing, based on the library of previously translated strings and the particular dataset, another string replacement procedure to generate a second localized dataset comprising one or more textual strings in the default language.

11. A system comprising:
a memory storing instructions; and
a processing device, operatively coupled to the memory, to execute the instructions to:
receive, from a first remote server of a plurality of remote servers, a request for a particular dataset that is stored in a data store, the particular dataset comprises a plurality of textual strings in a non-regional version;
determine a regional version for the particular dataset based on the request;
identify a library of previously translated strings associated with the non-regional version and the regional version;
select, from among a plurality of configuration files that are respectively associated with the plurality of remote servers, a first configuration file that is associated with the first remote server, the first configuration file comprising first information indicating that first textual strings associated with a first set of properties should be localized and second information indicating that second textual strings associated with a second set of properties should not be localized;
identify a first textual string of the particular dataset that is associated with the first set of properties and a second textual string of the particular dataset that is associated with the second set of properties;
generate, in the memory and based on the library of previously translated strings and a string replacement procedure, a localized dataset comprising one or more textual strings in the regional version to reduce a power consumption and increase a networking bandwidth associated with communicating with the plurality of remote servers, wherein generating the localized dataset comprises replacing of the first textual string of the particular dataset with a previously translated strings stored in the library of previously translated strings and abstaining from replacing the second textual string with another translated string stored in the library of previously translated strings:

receive a second request for a second dataset that is stored in the data store;

determine, in one or more libraries of previously translated strings, an absence of a localized string associated with the second dataset;

provide, responsive to determining the absence of the localized string, the second dataset to a translator to translate the second dataset according to a translation procedure that is different from the string replacement procedure to generate a translated second dataset; and update, based on the translated second dataset, the library of previously translated strings to allow a generation of a third localized dataset on the localized string to occur according to the string replacement procedure instead of the translation procedure.

12. The system of claim 11, wherein the request comprises a language identifier to the regional version in a language header of the request, and wherein the regional version corresponds to a preferred language of a user associated with the request.

13. The system of claim 11, wherein the processing device is to:
provide a client device associated with the request with access to the localized dataset.

14. The system of claim 11, wherein the processing device is to:
maintain, in a second data store, a plurality of associations between a plurality of configuration files and a plurality of remote server identifiers to a plurality of remote servers, wherein each configuration file is respectively associated with a respective remote server identifier.

15. The system of claim 11, wherein the processing device is to:
determine that the request is received from the first remote server of a plurality of remote servers.

16. The system of claim 11, wherein the first configuration file indicates a first set of strings for localization, and wherein the processing device is to:
identify a second set of strings in the particular dataset based on the first set of strings.

17. The system of claim 16, wherein the processing device is to:
identify, from the library of previously translated strings, one or more translated strings based on the first set of strings; and
replace the second set of strings in the particular dataset with the one or more previously translated strings.

18. The system of claim 17, wherein the first configuration file indicates that a first portion of the first set of strings comprises a dynamic value.

19. The system of claim 18, wherein to replace the second set of strings in the particular dataset with the one or more previously translated strings, the processing device is further to:
overwrite a second portion of the one or more previously translated strings with the dynamic value.

20. A non-transitory computer-readable medium storing instructions that, when executed by a processing device, cause the processing device to:
receive, from a first remote server of a plurality of remote servers, a request for a particular dataset that is stored in a data store, the particular dataset comprises a plurality of textual strings in a non-regional version;

determine a regional version for the particular dataset based on the request;

identify a library of previously translated strings associated with the non-regional version and the regional version;

select, from among a plurality of configuration files that are respectively associated with the plurality of remote servers, a first configuration file that is associated with the first remote server, the first configuration file comprising first information indicating that first textual strings associated with a first set of properties should be localized and second information indicating that second textual strings associated with a second set of properties should not be localized;

identify a first textual string of the particular dataset that is associated with the first set of properties and a second textual string of the particular dataset that is associated with the second set of properties;

generate, by the processing device in a memory of the processing device based on the library of previously translated strings and a string replacement procedure, a localized dataset comprising one or more textual strings in the regional version to reduce a power consumption and increase a networking bandwidth associated with communicating with the plurality of remote servers, wherein generating the localized dataset comprises replacing the first textual string of the particular dataset with a previously translated string and abstaining from replacing the second textual string with another translated string stored in the library of previously translated strings stored in the library of previously translated strings;

receive a second request for a second dataset that is stored in the data store;

determine, in one or more libraries of previously translated strings, an absence of a localized string associated with the second dataset;

provide, responsive to determining the absence of the localized string, the second dataset to a translator to translate the second dataset according to a translation procedure that is different from the string replacement procedure to generate a translated second dataset; and update, based on the translated second dataset, the library of previously translated strings to allow a generation of a third localized dataset on the localized string to occur according to the string replacement procedure instead of the translation procedure.

* * * * *